United States Patent Office 3,780,194
Patented Dec. 18, 1973

3,780,194
α,β-UNSATURATED ALDOXIME SWEETENERS
Edward M. Acton, Menlo Park, Morris A. Leaffer, Palo Alto, and Herbert Stone, Menlo Park, Calif., assignors to Sanford Research Institute, Menlo Park, Calif.
No Drawing. Filed Nov. 15, 1971, Ser. No. 198,939
Int. Cl. A23l 1/26
U.S. Cl. 426—342                                2 Claims

ABSTRACT OF THE DISCLOSURE

The oximes 1-cyclopentene-1-carboxyaldehyde syn-oxime, 1-cyclohexene-1-carboxaldehyde syn-oxime, and tiglaldehyde syn-oxime are found to have utility as artificial sweeteners owing to their sweet taste properties and good water solubilities. These oximes have potential application in low-calorie foods and beverages, particularly when used in combination with sucrose.

BACKGROUND OF THE INVENTION

Though previously described in the chemical literature, 1-cyclohexene-1-carboxaldehyde syn-oxime (Triebs and Helbig, Chemische Berichte, 92, 1559 (1959)) and tiglaldehyde syn-oxime (Wiley and Wakefield, J. Organic Chem., 25, 546 (1960)) have not previously been reported as sweet, nor even studied for their taste properties except in our recent report, J. Agr. Food Chem., 18, 1069 (1970). The oxime of 1-cyclopentene-1-carboxaldehyde has not been synthesized previously, and this crystalline syn-oxime isomer is described here, along with its sweep taste properties.

The chemical structures of these three oximes are somewhat related in structure to that of the known sweetening agent perillartine which is also an oxime. Specifically, these compounds possess olefinic unsaturation in the α,β-positions and syn isomerism of the oxime moiety. Perillartine is sweet in either the (+) or (−) optical isomer form or as the racemic mixture, the racemate being used as a sweetener for tobacco in Japan. The utility of perillartine in foods and beverages is limited by its very low solubility in water, 0.0003 molar at saturation. Although solutions of such a concentration have sweetness, their intensity is not sufficient to permit the practical replacement of sugar in food and drink. On a mole for mole basis, perillartine in solutione is calculated to be 2000 times as intense in its taste as sucrose, but the advantage of this intensity ratio cannot be realized in practice owing to its very low solubility. Further, perillartine suffers the disadvantage of having a decided gingery after-taste.

The 8,9-epoxide of perillartine, which forms the subject of our copending application, Ser. No. 69,165, filed Sept. 2, 1970, now U.S. Pat. No. 3,699,132, is an artificial sweetener with potential utility as a total replacement of sucrose owing to its purely sweet taste which is unaccompanied by other tastes or after-tastes. However, the practical utility of the epoxide is somewhat limited by its low solubility in water, 0.0030 molar at saturation, and by its relative instability in acidic media.

SUMMARY OF THE INVENTION

The present invention rests in part on the discovery of the novel oxime compound 1-cyclopentene-1-carboxaldehyde syn-oxime (I). It also rests on the discovery that this compound, as well as the related oxime compounds 1-cyclohexene-1-carboxaldehyde syn-oxime (II) and tiglaldehyde syn-oxime (III), are sweet tasting and have utility as sweetening agents for use in foods, beverages and other comestibles. Further, these compound have relatively good water solubilities ranging from about 0.02 to 0.15 molar at saturation.

The foregoing oxime compounds, designated I, II, and III, have the structures and properties shown below:

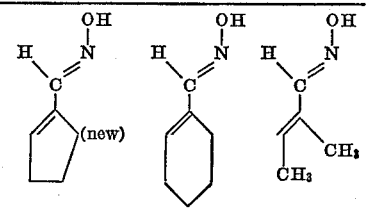

| Compound | I | II | III |
|---|---|---|---|
| M.P., ° C | 34–37 | 99–100 | 35–38 |
| Maximum solubility, M | 0.08 | 0.02 | 0.15 |
| Fraction of total taste identified as sweet, percent | 54 | 52 | 37 |

The taste intensity of the foregoing oxime compounds in solution is 40–50 times that of sucrose, when calculated on a mole for mole basis. These are much smaller ratios than that (2000) calculated for perillartine, but because of the enhanced solubilities as compared with that of perillartine, it is feasible to prepare solutions of these oximes (I, II, and III) with up to 8 times, 2 times, and 10 times, respectively, the taste intensity of a saturated perillartine solution. While sweetness in these oximes is accompanied in varying degree by other minor taste qualities, described as bitter, menthol, mint or coconut, each has the potential for use in combination with sucrose, as a partial substitute therefore, in food and drink. Such products would be low in caloric value and reduced in cariogenicity.

DESCRIPTION OF THE PREFERRED EMBODIMENTS

The following examples illustrate the invention, but are not to be construed as limiting the same.

Example 1

A solution of 16.8 g. (0.181 mole) of 1-cyano-1-cyclopentene (Wheeler and Lerner, J. Am. Chem. Soc., 78, 63 (1956)) in 10 ml. of benzene was treated with stirring and exclusion of moisture with 133 ml. of a benzene solution containing 0.200 mole of diisobutylaluminum hydride, while maintaining the temperature between 25 and 35°. After 30 minutes, the reaction mixture was poured into a stirred mixture of 12 M hydrochloric acid, ice, and ether. After 30 minutes, the ether layer was drawn off, and extraction of the 1-cyclopentene-1-carboxyaldehyde was completed with several additional portions of ether. The combined ether solutions afforded 4.9 g. (28%) of 1-cyclopentene-1-carboxaldehyde, B.P. 56–57° (20 mm.). A 3.1 g. portion (0.032 mole) of the aldehyde was stirred with 2.43 g. (0.035 mole) of hydroxylamine hydrochloride and 2.94 g. (0.035 mole) of sodium bicarbonate in 6 ml. of water for 1 hour. The aqueous layer was saturated with sodium chloride and the oily oxime layer was removed by extraction with three 5-ml. portions of ether. The combined ether solutions afforded 2.83 g. of yellow syrup, which was distilled, B.P. 102–108° (20 mm.) and recrystallized from pentane to give 1-cyclopentene-1-carboxaldehyde syn-oxime (I), M.P. 35–38°. The identify of this compound was established by nuclear magnetic resonance spectroscopy and confirmed by elemental analysis which shows:

Calcd. for $C_6H_9NO$ (percent): C, 64.8; H, 8.16; N, 12.6. Found (percent): C, 64.6; H, 8.24; N, 12.4.

A 0.005 molar solution of the oxime (I) had a taste intensity approximately equivalent to the taste intensity of a 0.25 molar sucrose solution. The tastes perceived in solutions of the oxime (I) were identified as sweet (estimated as 54% of the total taste), bitter (23%), and menthol or coconut and mint (20%).

Example 2

A 0.004 molar solution of 1-cyclohexene-1-carboxaldehyde syn-oxime (II), M.P. 99–100°, had a taste intensity approximately equivalent to the taste intensity of a 0.25 molar sucrose solution. The tastes perceived in solutions of this oxime were identified as sweet (estimated as 52% of the total taste), menthol and mint (22%), and bitter (8%).

Example 3

A 0.005 molar solution of tiglaldehyde syn-oxime (III), M.P. 35–38°, had a taste intensity approximately equivalent to the taste intensity of a 0.25 molar sucrose solution. The tastes perceived in solutions of this oxime were identified as sweet (estimated as 37% of the total taste), bitter (20%), and phenolic (10%).

The oxime compounds I, II, and III recited herein, which takes the form of white, to off-white crystalline solids are well adapted to be used, in dry pellet or powder form, or in the form of a solution in water or in ethanol or other appropriate organic solvent, as synthetic sweetening agents either alone or in conjunction with other sweetening agents such as sucrose, dextrose, sacchrine, or the like. They are also well adapted to be admixed with other food ingredients such as citric acid, flavoring, spices, starches, preservatives, dehydrated food stuffs, and the like. They are particularly well adapted, for example, to be used in various dietary foods and beverages as a replacement for approximately one-half of the sucrose which would otherwise be employed in the product, thereby providing a comestible the caloric value of which has also been reduced in proportion as the sucrose has been replaced.

We claim:

1. The method of sweetening a comestible which comprises adding thereto an effective amount of at least one oxime compound selected from the group consisting of 1-cyclopentene-1-carboxaldehyde syn-oxime, 1-cyclohexene-1-carboxaldehyde syn-oxime, and tiglaldehyde syn-oxime.

2. The method of claim 1 wherein the comestible is also sweetened with sucrose.

References Cited

UNITED STATES PATENTS 2,761,783    9/1956    Ferguson _____ 99—141

OTHER REFERENCES

E. M. Acton, M. A. Leaffer, S. M. Oliver, H. Stone: J. Agr. Food Chem, vol 18, No 6, pp. 1061–1068.

RAYMOND N. JONES, Primary Examiner

T. G. WISEMAN, Assistant Examiner

U.S. Cl. X.R.

260—566 A; 426—217